United States Patent
Manmohan et al.

(10) Patent No.: US 8,413,144 B1
(45) Date of Patent: *Apr. 2, 2013

(54) PROVIDING APPLICATION-AWARE HIGH AVAILABILITY OF VIRTUAL MACHINES

(75) Inventors: Sarin Sumit Manmohan, Maharashtra (IN); Yojana Narharrao Raut, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/847,506

(22) Filed: Jul. 30, 2010

(51) Int. Cl.
*G06F 9/455* (2006.01)
*G06F 9/46* (2006.01)
*G06F 11/00* (2006.01)

(52) U.S. Cl. .................. 718/1; 718/103; 714/2; 714/1

(58) Field of Classification Search .................. None
See application file for complete search history.

(56) References Cited

U.S. PATENT DOCUMENTS

| | | | | |
|---|---|---|---|---|
| 7,213,246 B1 * | 5/2007 | van Rietschote et al. | ......... | 718/1 |
| 7,478,149 B2 * | 1/2009 | Joshi et al. | .................... | 709/223 |
| 7,529,822 B2 * | 5/2009 | Joshi et al. | .................... | 709/223 |
| 7,797,587 B2 * | 9/2010 | Vasudevan et al. | .......... | 714/47.1 |
| 8,171,349 B2 * | 5/2012 | Stern et al. | .................... | 714/47.1 |
| 8,184,776 B2 * | 5/2012 | Yuan | .............................. | 378/157 |
| 8,209,684 B2 * | 6/2012 | Kannan et al. | .................... | 718/1 |
| 8,219,990 B2 * | 7/2012 | Khanna | ............................. | 718/1 |
| 2004/0153708 A1 * | 8/2004 | Joshi et al. | ........................ | 714/4 |
| 2008/0104586 A1 * | 5/2008 | Thorton et al. | .................... | 718/1 |
| 2008/0307259 A1 * | 12/2008 | Vasudevan et al. | ............. | 714/23 |
| 2010/0037089 A1 * | 2/2010 | Krishnan et al. | .................. | 714/5 |
| 2011/0314345 A1 * | 12/2011 | Stern et al. | .................... | 714/47.1 |

* cited by examiner

*Primary Examiner* — Jennifer To
(74) *Attorney, Agent, or Firm* — Campbell Stephenson LLP

(57) ABSTRACT

Various systems and methods can provide application-aware high availability of virtual machines. For example, one method involves receiving information indicating a state of an application executing in a virtual machine. The information is received by a computing device implementing a virtual machine monitoring agent that is monitoring the virtual machine. In response to receiving the information, the method determines whether the virtual machine should be restarted, based at least in part on the state of the application executing in the virtual machine. The method then generates information indicating whether the virtual machine should be restarted, in response to making the determination.

14 Claims, 5 Drawing Sheets

PROVIDING APPLICATION-AWARE HIGH AVAILABILITY OF VIRTUAL MACHINES

FIELD OF THE INVENTION

This invention relates to high availability and, more particularly, to providing highly available applications in virtual machines.

DESCRIPTION OF THE RELATED ART

Virtualization systems allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

Some virtualization systems provide a virtualization controller that can manage one or more virtual machines implemented on one or more computing devices. Such a virtualization controller can communicate with the virtual machines and control the operation of those virtual machines. In some environments, the virtualization controller can even manage the virtual machines in a manner that provides high availability of the virtual machines, such that if a particular virtual machine experiences a failure, the virtualization controller can restart that failed virtual machine on another computing device. Unfortunately, in conventional virtualization systems that provide highly available virtual machines, it may not be possible to also efficiently make an application that executes within a highly-available virtual machine highly available.

SUMMARY OF THE INVENTION

Various systems and methods for providing application-aware high availability of virtual machines are disclosed. For example, one method involves receiving information indicating a state of an application executing in a virtual machine. The information is received by a computing device implementing a virtual machine monitoring agent that is monitoring the virtual machine. In response to receiving the information, the method determines whether the virtual machine should be restarted, based at least in part on the state of the application executing in the virtual machine. The method then generates information indicating whether the virtual machine should be restarted, in response to making the determination. If the information indicates that the virtual machine should be restarted, generation of the information will cause the virtual machine to be restarted (e.g., this can be state information accessed by a cluster controller, which will restart the virtual machine based upon the value of the state information). In one embodiment, the determination is made by an agent executing in a virtual machine monitor.

Receiving the information can involve accessing state information associated with a cluster service group. The method can also involve identifying an order in which the plurality of applications should be stopped or started (e.g., based upon dependencies between cluster service groups).

In some embodiments, receiving the information involves receiving information identifying an operating status of each of several applications executing in the virtual machine. In such embodiments, the determination can be based upon the operating status and a priority of each of the applications. The method can determine that the virtual machine should not be restarted, in response to the information identifying that a higher-priority application of the plurality of applications is executing properly and a lower priority application of the plurality of applications is failed. Alternatively, the method can determine that the virtual machine should be restarted, in response to the information identifying that a higher-priority application of the plurality of applications is failed and a lower priority application of the plurality of applications is executing properly.

The method can also involve generating the information indicating the state of the application. This operation can be performed by an application monitoring agent executing outside of the virtual machine, where the application monitoring agent obtains the state of the application by interacting with an operating system interface provide by an operating system of the virtual machine. In some embodiments, the method can involve deciding that the application monitoring agent should attempt to restart the application, in response to the operating system interface indicating that the application is not operating properly, where the attempt to restart the application takes place prior to the determination as to whether the virtual machine should be restarted. The method can also involve starting or stopping the application by interacting with the operating system interface provided by the operating system of the virtual machine (this can be done even if no failure is detected).

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
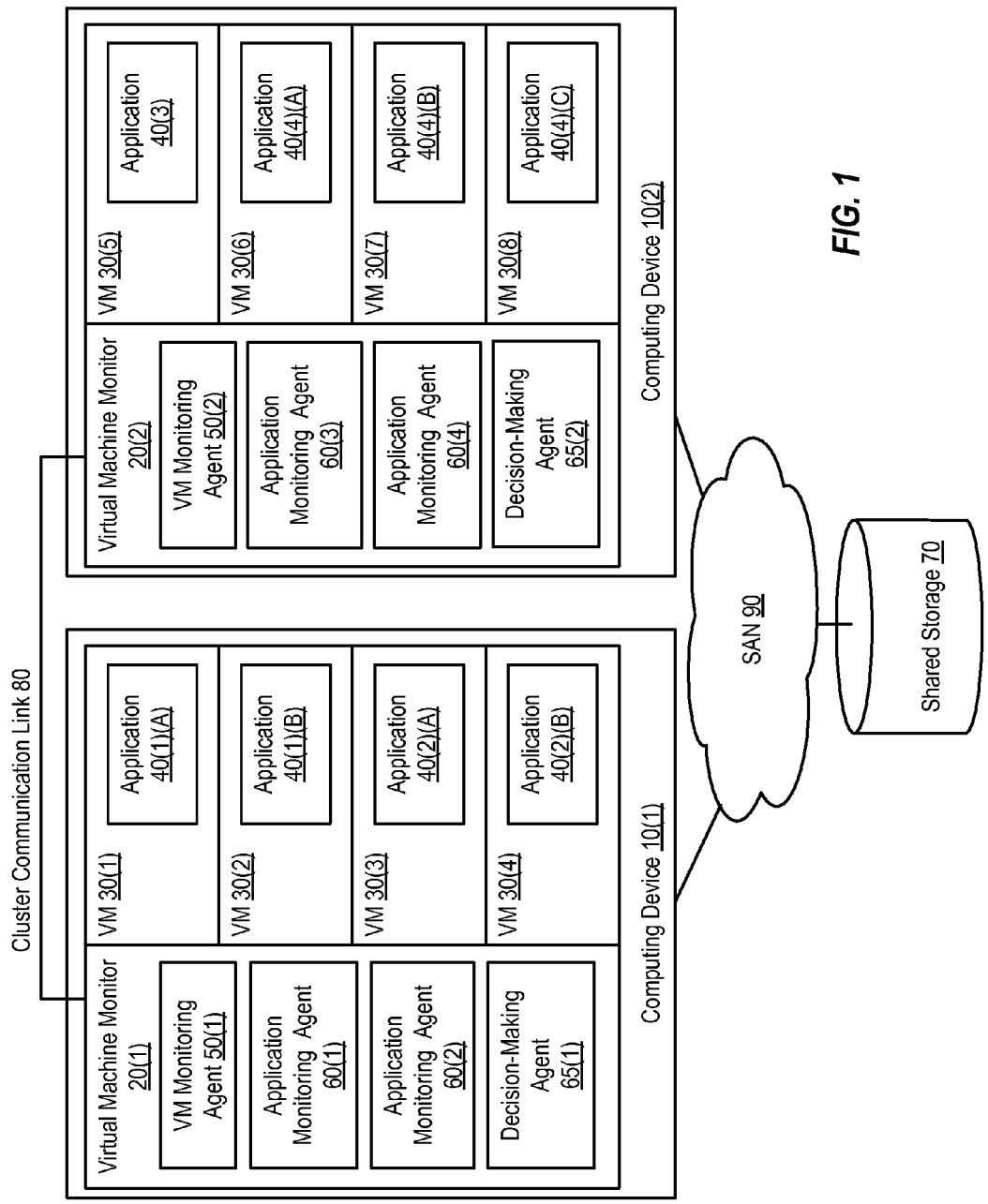
FIG. 1 is a block diagram of a system that provides high availability of applications in a highly-available virtual machine environment, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a virtualization system. As shown, the virtualization system includes two computing devices 10(1) and 10(2). In this example, each computing device implements a virtual machine monitor (also referred to as a hypervisor) and a set of virtual machines (VMs). As shown, computing device 10(1) implements virtual machine monitor 20(1) and VMs 30(1)-30(4). Similarly, computing device 10(2) implements virtual machine monitor 20(2) and VMs 30(5)-30(6). It is noted that alternative embodiments can implement different numbers of VMs per computing device, and the same system can include one or more computing devices that each implement a different number of VMs than other computing devices within the same system.

The virtual machines VM 30(1)-VM 30(8) each provide a self-contained instance of an executing operating system. VMs executing on the same computing device can be implemented using the same or different operating systems. In one embodiment, the VMs execute an operating system from the Windows™ family of products available from Microsoft Corporation of Redmond, Wash. A client interacting with a VM will typically interact in exactly the same manner that a client would interact with a standalone operating system operating on independent hardware. The virtual machines and virtual machine monitors can be implemented using virtualization software such as that in the HyperV™ family of products, available from Microsoft Corporation of Redmond, Wash. The virtual machine monitors can execute directly on the hardware of their respective computing devices, while the VM operating systems operate within their respective virtual machine monitors. Each virtual machine monitor is configured to monitor the state of each VM on the same computing device to identify whether each VM is executing properly. In response to detecting the failure of a VM, a virtual machine monitor can restart the failed VM on another computing device.

The two computing devices 10(1) and 10(2) can be coupled to communicate via a network such as the Internet. In some embodiments, the computing devices can be located in the same geographical vicinity (e.g., in the same room, building, or city). In other embodiments, such as those that facilitate disaster recovery, the computing devices may be geographically remote from each other (e.g., in different cities, states, or even countries).

One or more applications executes within each of the VMs. For simplicity, only a single application is illustrated within each VM of FIG. 1; however, multiple applications may execute within each VM in other situations. Such applications can be database applications, mail servers, and the like. Here, application 40(1)(A) executes in VM 30(1), application 40(1)(B) executions in VM 30(2), application 40(2)(A) executes in VM 30(3), application 40(2)(B) executes in VM 30(4), application 40(3) executes in VM 30(5), application 40(4)(A) executes in VM 30(6), application 40(4)(B) executes in VM 30(7), and application 40(4)(C) executes in VM 30(8).

The type of application executing on a given VM can be the same or different than the type of application executing on another VM within the same virtualization system. Here, the same types of applications are assigned the same parenthetical numerical, while different instances of the same type of application are assigned different alphabetic identifiers. Thus, applications 40(1)(A) and 40(1)(B) are different instances of the same type of application.

Computing devices 10(1) and 10(2) are coupled to a shared storage device 70 by a storage area network 90 or other network. Various applications executing on computing devices 10(1) and 10(2) can store information on shared storage device 70.

At least two monitoring agents (a special type of application) execute within each virtual machine monitor. In this example, a single VM monitoring agent executes in each virtual machine monitor. VM monitoring agent 50(1) executes in virtual machine monitor 20(1) and is configured to provide monitoring of VMs 30(1)-30(4) executing on computing device 10(1). VM monitoring agent 50(2) executes in virtual machine monitor 20(2) and is configured to provide monitoring of VMs 30(5)-30(8) executing on computing device 10(2). VM monitoring agents 50(1) and 50(2) monitor the state of each VM on the same computing device by monitoring shared storage 70, the configuration information for the monitored virtual machines, the operating status (e.g., failed, operating properly, or intentionally taken offline) of the monitored virtual machines, and the like.

In this example, each VM monitoring agent monitors all of the VMs executing on the same computing device as the VM monitoring agent. However, in alternative embodiments, there may be more than on VM monitoring agent per computing device, or even a one-to-one correspondence between VM monitoring agents and the VMs being monitored.

The second type of monitoring agent is an application monitoring agent configured to monitor one or more instances of a specific type of application executing in VMs on the same computing device as the application monitoring agent. Each application monitoring agent is configured to monitor the state of one or more applications executing within the same VM, which allows a decision-making agent decide whether the monitored state requires any action to be taken, and to provide information indicative of the monitored state to a decision-making agent (e.g., in the form of status information associated with a cluster service group, as described in more detail below).

In this example, each application monitoring agent executes in a separate partition than the application(s) monitored by that application monitoring agent. The application monitoring agents are configured to remotely communicate with each VM operating system (OS) (e.g., using interfaces such as the Windows Management Instrumentation (WMI) or remote WIN32 application programming interface (API) provided in the Windows™ family of operating systems) in order to obtain information about the state of the applications executing within the VM.

A decision-making agent executes in each virtual machine monitor and receives information generated by the VM and application monitoring agents in the same virtual machine monitor. Based upon the monitored state of the VMs and/or applications, the decision-making agent can decide whether an application or a VM should be restarted.

As shown, application monitoring agent 60(1) executes in virtual machine monitor 20(1) and monitors the state of type 1 applications 40(1)(A) in VM 30(1) and 40(1)(B) in VM 30(2). Application monitoring agent 60(2) executes in virtual machine monitor 20(1) monitors the state of type 2 applications 40(2)(A) in VM 30(3) and 40(2)(B) in VM 30(4). Application monitoring agent 60(3) executes in virtual machine monitor 20(2) and monitors the status of type 3 application 40(3) in VM 30(5). Application monitoring agent 60(4) executes in virtual machine monitor 20(2) and monitors the state of type 4 applications 40(4)(A) in VM 30(6), 40(4)(B) in VM 30(7), and 40(4)(C) in VM 30(8).

Decision-making agent 65(1) executes in virtual machine monitor 20(1) and makes decisions based upon the statuses monitored by application monitoring agents 60(1) and 60(2) and VM monitoring agent 50(1). Decision-making agent 65(2) executes in virtual machine monitor 20(2) and makes decisions based upon the statuses monitored by application monitoring agents 60(3) and 60(4) and VM monitoring agent 50(2).

While FIG. 1 illustrates an embodiment in which a single application monitoring agent can monitor multiple applications of the same type, alternative embodiments may employ multiple monitoring agents per type, such that, for example, there is a one-to-one correspondence between applications being monitored and application monitoring agents. Alternatively, alternative embodiments may employ a single monitoring agent to monitor all types of applications on the same computing device, regardless of the number of and different types of applications executing on that computing device.

In some embodiments, the decision-making and VM and application monitoring agents are implemented as VERITAS Cluster Server (VCS) agents, available from Symantec, Corp. of Mountain View, Calif. In such embodiments, the virtual machine monitors can be configured as nodes of a cluster. Here, virtual machine monitors 20(1) and 20(2) form a two-node cluster. The VM monitoring agents can each be configured as a service group of a respective cluster. Thus, VM monitoring agent 50(1) can be configured as a service group in the node containing virtual machine monitor 20(1), and VM monitoring agent 50(2) can be configured as a service group in the node containing virtual machine monitor 20(2). Each application monitoring agent can also be configured as a service group of the cluster. Thus, application monitoring agents 60(1)-60(2) can be configured as respective service groups in the node containing virtual machine monitor 20(1), and application monitoring agents 60(3)-60(4) can be configured as respective service groups in the node containing virtual machine monitor 20(2). Alternatively, the VM and application monitoring agents within the same node may be configured as a single service group. The decision-making agents can be configured as part of the cluster controller. The VM and application monitoring agents can each be configured with the same information identifying acceptable failover nodes on which a VM monitored by those agents can be restarted. In the case of the application monitoring agents, the configuration information can also uniquely identify the operating systems of each VM(s) in which those application monitoring agents are monitoring applications.

In embodiments in which the VM and application monitoring agents are configured as different service groups, a dependency can be created between the VM monitoring agent and the application monitoring agents in the same node of the cluster (i.e., within the same virtual machine monitor). For example, each application monitoring agent can be configured as one or more resources that are entirely within a service group corresponding to that specific application monitoring agent, which are in turn entirely within a service group corresponding to the VM monitoring agent on the same VM. Alternatively, a dependency can be created between the VM and application monitoring agents. Creating a dependency, regardless of the technique used, allows the decision-making agent to determine the order in which applications should be restarted after the virtual machine in which those applications execute is restarted. The dependencies between service groups can also identify the order in which the applications should be stopped before stopping the virtual machine in which those applications execute (e.g., in order to restart the virtual machine).

In this example, the cluster can be configured so that if the decision-making agent decides that a VM needs to be restarted, the decision-making agent will communicate this decision to the appropriate VM monitoring agent, which will then indicate that the VM should be restarted by setting state information associated with the VM (e.g., to indicate that the VM is failed). If a VM monitoring agent indicates that a VM needs to be restarted, that VM will be restarted on another computing device (e.g., by the cluster controller). Thus, if VM monitoring agent 50(2) indicates that VM 30(7) needs to be restarted (e.g., by setting state information associated with a service group to indicate that VM 30(7) is failed, such that a cluster controller (not shown) can read the state information), VM 30(7) will be restarted. Alternatively, setting the state information can cause the VM monitoring agent to restart the VM. The VM can be restarted on the same or on another computing device other than computing device 10(2).

As described above, application monitoring agents 60(1)-60(4) will monitor applications and communicate the results of the monitoring to a decision-making agent, which will decide whether to take no action (e.g., if the application is executing properly and/or has been intentionally taken offline), cause a failed application to be restarted (e.g., if a number of retry attempts for the application has not been exceeded), or cause a VM containing a failed application to be restarted. The decision-making agent can cause a VM containing a failed application to be restarted by communicating information indicating that the application has failed to the appropriate VM monitoring agent.

For each monitored application, an application monitoring agent can detect whether that application is executing properly. In at least some embodiments, an application monitoring agent can also distinguish between whether a non-executing application is not executing due to failure or due to being intentionally taken offline. For example, an application monitoring agent can provide an interface (e.g., a graphical user interface, command line interface, or the like) via which an administrator can inform the application monitoring agent that an application is being taken offline, and the application monitoring agent can, in response, update state information associated with the monitored application to indicate that the application is intentionally offline. When the application monitoring agent detects that an application is not executing, the application monitoring agent can check (e.g., by accessing stored information associated with the application) to see whether an administrator indicated that the application was being taken offline prior to the application ceasing execution. When an application is restarted after being intentionally taken offline, the administrator can again (e.g., via the interface) inform the application monitoring agent about the change in application status. Alternatively, the application monitoring agent can simply detect that the application has been restarted the next period and clear any state information previously associated with that application.

In addition to allowing an administrator to indicate when applications are being intentionally taken offline (in order to distinguish applications in that state from applications that have failed), the application monitoring agents can also allow the administrator to stop and start applications via the application monitoring agents. In other words, the application monitoring agents can allow the administrator to select an application to be stopped or started. In response to an administrator selecting an application, the application monitoring agent can communicate with the operating system of the VM in order to stop or start the application, as specified by the administrator. The application monitoring agent may also start or start applications in other situations (e.g., as part of the VM in which those applications execute being stopped or started), absent direct involvement of an administrator. Accordingly, the application monitoring agent can stop and start applications within the VM from outside of the VM.

As described above, the monitoring agent identifies whether each monitored application is executing properly or not. If not, the monitoring agent, at least in some embodiments, further distinguishes whether the application is not executing due to failure or due to being intentionally taken offline. The monitoring agent can generate information describing the application and its detected execution state and provide this information to the decision-making agent. For example, application monitoring agent 60(1) can detect that application 40(1)(A) has failed and can provide information (e.g., in the form of status information for the service group containing application monitoring agent 60(1) that can be read by the decision-making agent) indicating that application 40(1)(A) is failed to decision-making agent 65(1).

If there is only a single monitored application in a VM, the decision-making agent for that application can simple decide what action to take, if any, for that VM based upon the state of that single application. The decided-upon action is effected by generating information describing the ultimate state of the application(s) on a given VM and providing that information to a VM monitoring application. If the application is executing normally, the decision-making agent can decide to take no action. This action can be effected by simply setting state information (e.g., as associated with a service group corresponding to the application) to indicate that the application is executing normally. If the application has failed, the application monitoring agent and/or decision-making agent can decide to try to restart the application and/or to restart the VM containing the application. In the latter situation, restarting the VM containing the application effectively restarts the failed application. If the application has been intentionally taken offline (i.e., if the application is not executing but has not experienced a failure), the decision-making agent can decide that there is no need to take further action. The decision-making agent can obtain the state of each monitored application, make a decision based on that state, and generate information (accessible by the VM monitoring agent) indicating that state and/or decision repeatedly throughout the operation of the system (e.g., once per pre-defined monitoring period).

If multiple applications are being monitored on a single VM, the decision-making agent will use the status of each monitored application, as detected by the application monitoring agents for each type of application being monitored in the VM, to decide which action to take based upon the status and a priority of each application. The application priorities can be configured by an administrator (e.g., by entering information via a command line interface or a graphical user interface) and stored by the decision-making agent.

In general, when there are multiple applications in a VM, a decision-making agent will give more weight to the status of a higher priority application than a lower priority application when making its decision. Any of a variety of different algorithms that takes application priority into account can be used to implement this process. For example, a simple algorithm can simply evaluate the status of the highest priority application and make the determination based on that application's status. If the highest priority application is executing properly, the decision-making agent can decide that no further action needs to be taken, regardless of the state of any lower priority application. Similarly, even if all lower priority applications are operating properly, the decision-making agent can decide that the VM should be restarted if the highest priority application has failed. In this example, all of the weight is given to the status of the highest priority application.

Other algorithms can allocate more weight to lower priority applications than the above example, which allocated no weight to any application other than the highest priority one. For example, one algorithm can compare the sum of the priorities of failed applications being monitored within the VM to the sum of the priorities of the properly executing applications being monitored within the VM. If the sum corresponding to failed applications is greater, the decision-making agent can decide that the VM should be restarted (if the failed application(s) cannot be restarted by their respective application monitoring agents). Similarly, if the sum corresponding to properly executing applications is greater, the decision-making agent can decide that the VM does not need to be restarted. If the sums are equal, the decision-making agent can, in one embodiment, decide to restart the VM. Another algorithm can compare the sum of priorities of properly executing and intentionally offlined applications to the sum of priorities of failed applications. If the former sum is greater, the decision-making agent will decide that the VM does not need to be restarted. If the latter sum is greater, the decision-making agent will generate status information indicating that the VM has failed, causing the VM monitoring agent to restart the VM.

In some embodiments, instead of automatically communicating the failed status of a failed application to a decision-making agent as soon as the failure is detected, the application monitoring agent may instead first decide that the application monitoring agent should attempt to restart the failed application. The application monitoring agent can be configured (e.g., by an administrator entering information via an interface) with a maximum number of retry attempts to allow that can control the number of times this decision is reached for a failed application before the application monitoring agent instead communicating the status of the failed application to a decision-making agent.

As noted above, various information used to control each application monitoring and/or VM monitoring agent can be configured by an administrator entering information via an interface. This information can vary from VM to VM and from application to application. Thus, in one VM, an administrator can select to have Application A have a higher priority than was assigned to an instance of Application A in another VM.

Figure 2:
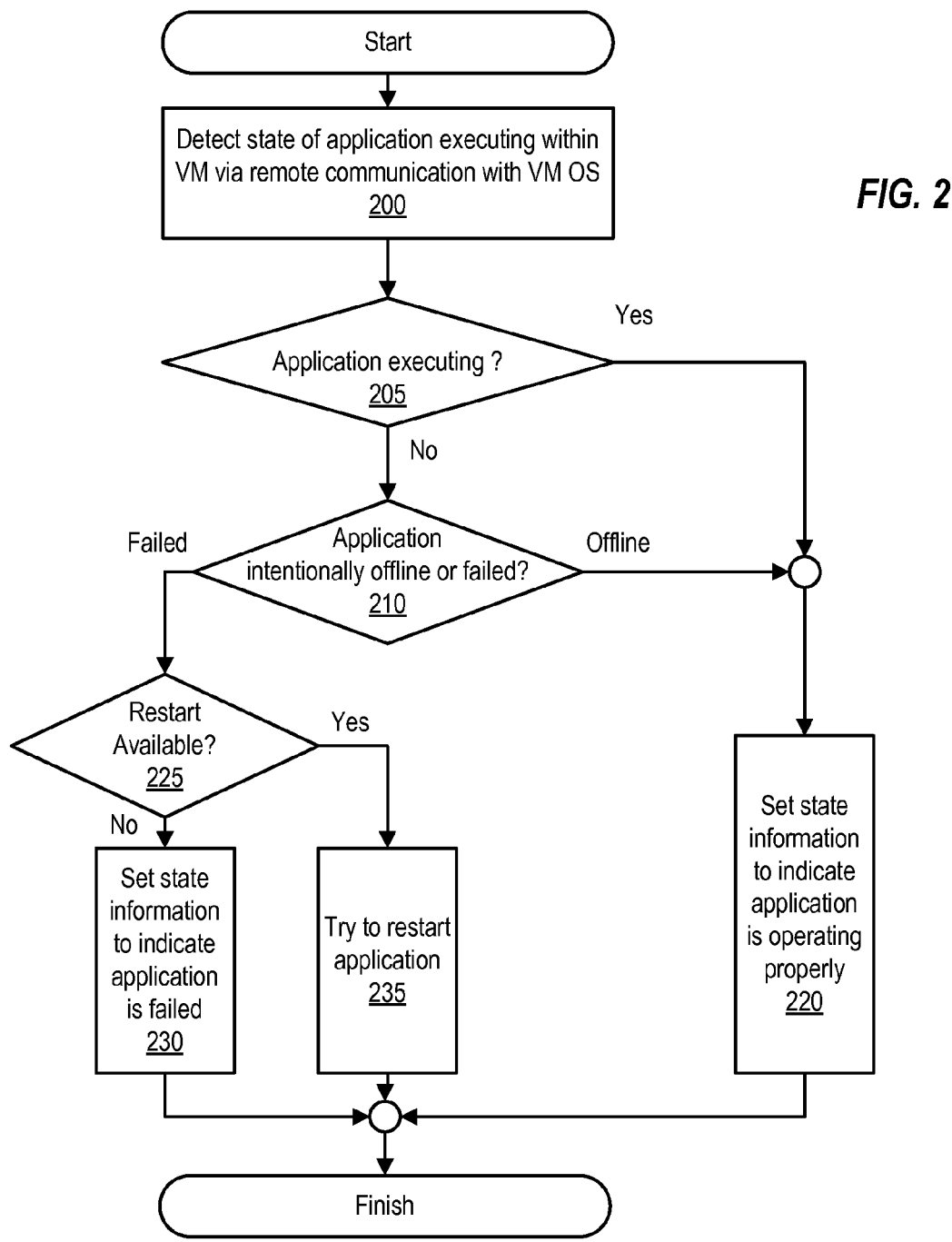
FIG. 2 is a flowchart of a method of providing high availability of an application in a highly-available virtual machine environment, according to one embodiment of the present invention.

FIG. 2 illustrates a method of providing a highly available application within a virtualization environment. This method can be performed by an application monitoring agent operating in the virtual machine monitor, in conjunction with a decision-making agent.

The method begins when an application monitoring agent executing within the virtual machine monitor detects the state of an application executing within a virtual machine (e.g., by remotely communicating with the virtual machines operating system (OS)), as shown at 200. Performance of operation 200 may involve a service group agent monitoring the status of the application being monitored and generating information indicating the monitored status.

If the monitored application is executing properly, as determined at 205, the application monitoring agent can generate status information (e.g., for a service group associated with the application monitoring agent) indicating that the application is operating properly, as shown at 220. If the application is not executing properly, a decision can be made as to whether the application is failed or has been intentionally taken offline, as shown at 210. If the application has been intentionally taken offline, the monitoring agent will generate information indicating that the application is operating properly, as shown at 210 and 220, since there is no need for the monitoring agent to attempt to restart the application or the VM containing the application in this situation. Performance of operation 210 can involve an application monitoring agent detecting the state of the application using information entered by an administrator in the case of the application having been intentionally taken offline.

If the application is failed, the application monitoring agent will determine whether an option to attempt to restart the application is available, as shown at 225. Performance of operation 225 can involve accessing information entered by an administrator indicating an acceptable number of times to attempt to restart the application before reporting the application as being failed to a decision-making agent. If restarting the application is an available option, the application monitoring agent will attempt to restart the application, as shown at 235. If restarting the application is not an available option, or if the attempt to restart the application failed, the application monitoring agent will generate information indicating that the application has failed and make this information accessible to a decision-making agent, as shown at 230. The decision making agent can request that the VM monitoring agent restart the VM based on the priority of the faulted application, if there are multiple applications executing within the VM.

Figure 3:
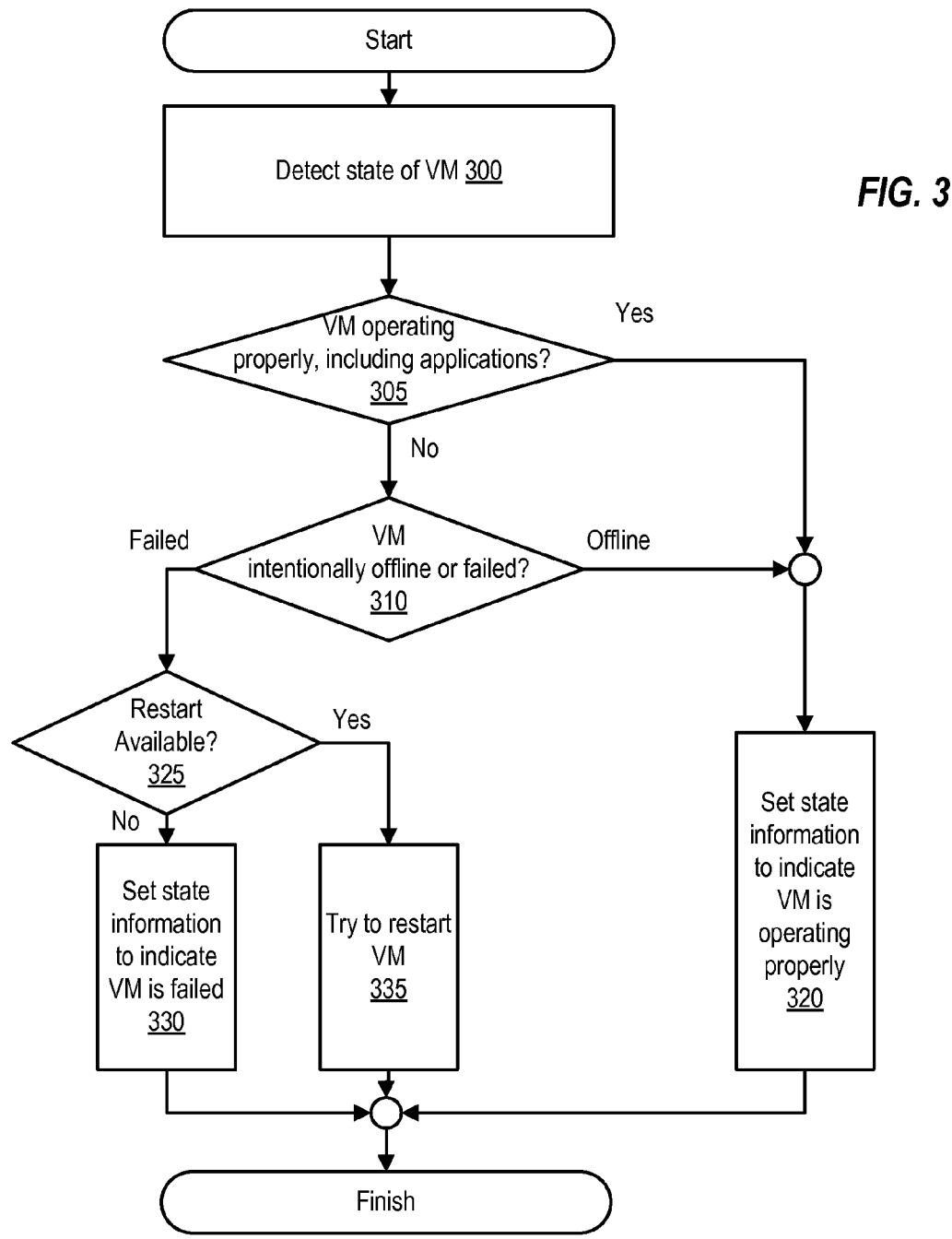
FIG. 3 is a flowchart of a method of providing application-aware high availability of a virtual machine, according to one embodiment of the present invention.

FIG. 3 is an example of a method of providing application-aware high availability of multiple VMs in a virtualization environment. This method can be performed by a VM monitoring agent in conjunction with a decision-making agent.

The method of FIG. 3 begins at 300, when a VM monitoring agent detects the operating state (e.g., executing properly, failed, or intentionally taken offline) of each of one or more VMs. Detecting this operating state also involves accessing information generated by a decision-making agent. The decision-making agent detects the state of one or more applications executing on each monitored VM, as generated by one or more application monitoring agents (e.g., by accessing service group state information for each of those application monitoring agents). If there are multiple applications within a single monitored VM, the decision-making agent can also detect the priorities of each of those monitored applications (e.g., by accessing configuration information entered by an administrator to identify those priorities).

At 305, the VM monitoring agent determines whether a given VM is operating properly, which includes the decision-making agents determination as to how to handle the applications within the VM. If there are multiple applications executing on the VM, of which some but not all of the applications are operating properly, the decision-making agent can use one of the algorithms described above to reach this decision, or any other algorithm that takes the application priorities into account.

If the VM and the desired applications are executing properly (as detected at 305) or if the VM and/or the desired applications have been intentionally taken offline (as detected at 310, the VM monitoring agent generates state information indicating that the VM is operating properly. This state information can then be read by a cluster controller, which will determine that the VM does not need to be restarted if the state information indicates that the VM is operating properly.

If the desired applications and/or the VM are not executing properly, the VM monitoring agent can determine (e.g., in response to the decision-making agent having looked at the operating status of the highest priority application, by comparing the sums of priorities of failed and intentionally offlined applications, or the like) whether the desired applications are failed, as shown at 310. If the desired applications are failed, the VM monitoring agent can then determine whether restart of the VM is an available option, as shown at 325. If so, the VM monitoring agent can attempt to restart the VM within the same computing device, as shown at 335. If restart of the VM is not an available option, the VM monitoring agent will set state information (e.g., for a service group associated with the VM monitoring agent) to indicate that the VM has failed, as shown at 330, which will in turn cause a cluster controller to restart the VM on another computing device.

Figure 4:
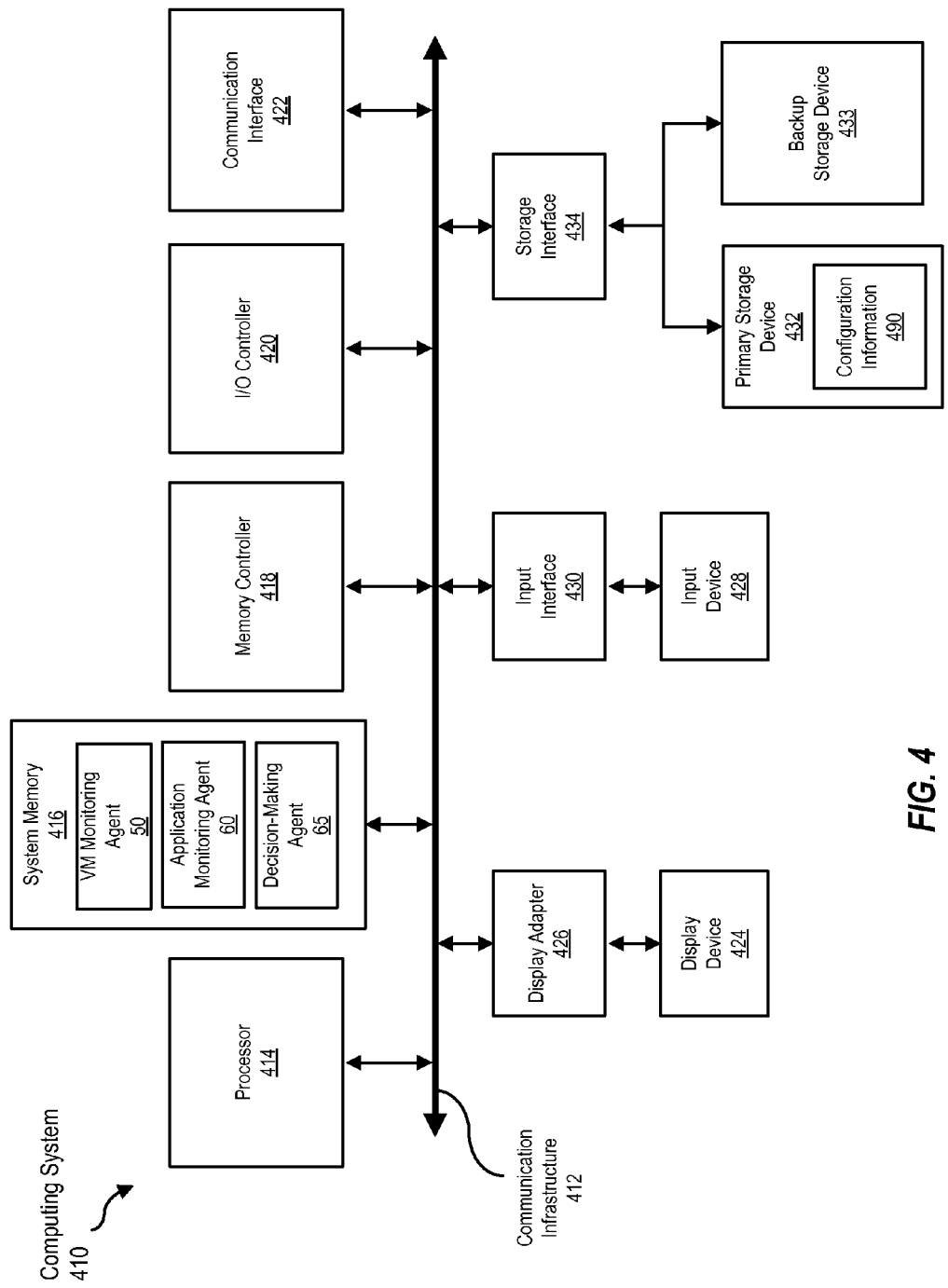
FIG. 4 is a block diagram of a computing device, illustrating how a virtual machine monitoring agent and an application monitoring agent can both be implemented in software, according to one embodiment of the present invention.

FIG. 4 is a block diagram of a computing system 410 capable of implementing a decision making agent, VM monitoring agent, and/or an application monitoring agent as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements a decision-making agent, VM monitoring agent, and/or an application monitoring agent, computing system 410 becomes a special purpose computing device that is configured to provide high availability of one or more applications within a highly-available virtualization environment.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing all or some of the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of a VM monitoring agent 50 (e.g., one of VM monitoring agents 50(1)-50(2) from FIG. 1), application monitoring agent 60 (e.g., one of application monitoring agents 60(1)-60(4) of FIG. 1), and/or decision-making agent 65 (e.g., one of decision-making agents 65(1)-65(2) of FIG. 1) may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as configuration information 490 (e.g., indicating the priority of applications and the number of retry attempts per application) as described above.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
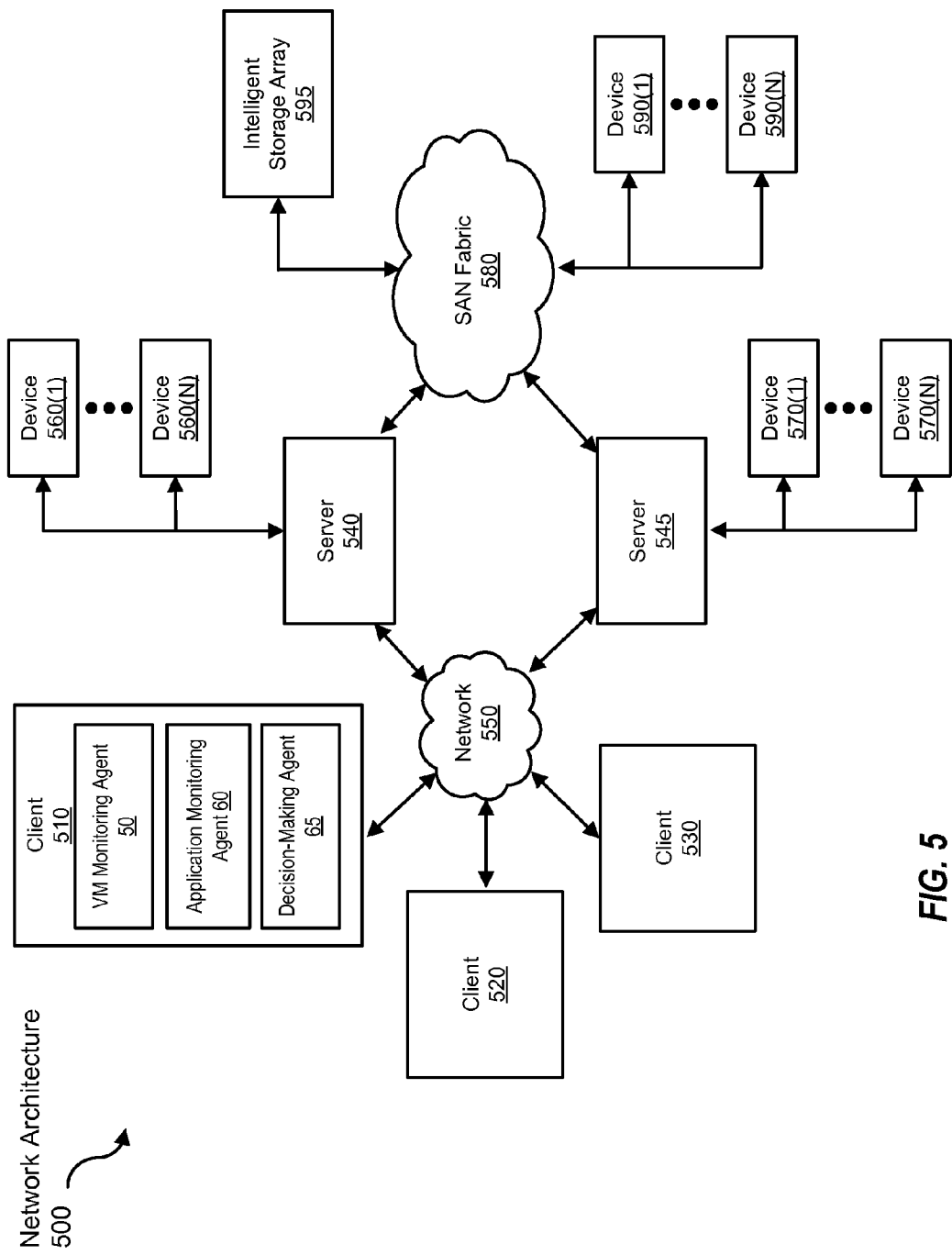
FIG. 5 is a block diagram of a networked system, illustrating how various computing devices can communicate via a network, according to one embodiment of the present invention.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include decision-making agents 65, VM monitoring agents 50, and/or application monitoring agents 60 as shown in FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS).

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of the system shown in FIG. 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an application monitoring agent and/or a VM monitoring agent in FIG. 1 may transform the configuration of a virtualization system by causing a virtual machine to be restarted on another host.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
generating information indicating a state of each of a plurality of applications executing in a virtual machine, wherein
the generating is performed by an application monitoring agent executing outside of the virtual machine,
the application monitoring agent obtains the state of each of the plurality of applications by interacting with an operating system interface provided by an operating system of the virtual machine, and
the application monitoring agent is configured to monitor at least one application on each of a plurality of virtual machines;
receiving the information indicating the state of each of the plurality of applications executing in the virtual machine, wherein the information is received by a computing device implementing a virtual machine monitoring agent that is monitoring the virtual machine, wherein the application monitoring agent and the virtual machine monitoring agent are implemented by a virtual machine monitor;

in response to the receiving, determining whether the virtual machine should be restarted, based at least in part on the state of each of the plurality of applications executing in the virtual machine and a priority of each of the plurality of applications;

generating information indicating whether the virtual machine should be restarted in response to the determining; and restarting the virtual machine if the information indicates that the virtual machine should be restarted.

2. The method of claim 1, further comprising determining that the virtual machine should not be restarted, in response to the information identifying that a higher-priority application of the plurality of applications is executing properly and a lower priority application of the plurality of applications is failed.

3. The method of claim 1, further comprising identifying an order in which the plurality of applications should be stopped or started.

4. The method of claim 1, further comprising deciding that the application monitoring agent should attempt to restart the application, in response to the interacting with the operating system interface indicating that the application is not operating properly, wherein the attempting to restart the application is performed prior to the determining whether the virtual machine should be restarted.

5. The method of claim 1, further comprising starting or stopping the application by interacting with the operating system interface provided by the operating system of the virtual machine.

6. The method of claim 1, wherein the receiving the information comprises accessing state information associated with a cluster service group.

7. A system comprising:
one or more processors; and
memory coupled to the one or more processors, wherein the memory stores program instructions executable by the one or more processors to:
generate information indicating a state of each of a plurality of applications executing in a virtual machine, wherein
generating the information is performed by an application monitoring agent executing outside of the virtual machine,
the application monitoring agent obtains the state of each of the plurality of applications by interacting with an operating system interface provided by an operating system of the virtual machine, and
the application monitoring agent is configured to monitor at least one application on each of a plurality of virtual machines;
monitor an operating state of a virtual machine, wherein
monitoring the virtual machine is performed by a virtual machine monitoring agent, and
the application monitoring agent and the virtual machine monitoring agent are implemented by a virtual machine monitor;
receive information indicating the state of each of the plurality of applications executing in the virtual machine;
in response to the operating state of the virtual machine and receipt of the information, determine whether the virtual machine should be restarted, based at least in part on the state of each of the plurality of applications executing in the virtual machine and a priority of each of the plurality of applications; and
restart the virtual machine in response to the determination as to whether the virtual machine should be restarted.

8. The system of claim 7, wherein the program instructions are further executable to determine that the virtual machine should not be restarted, in response to the information identifying that a higher-priority application of the plurality of applications is executing properly and a lower priority application of the plurality of applications is failed.

9. The system of claim 7, wherein the program instructions are further executable to determine that the virtual machine should be restarted, in response to the information identifying that a higher-priority application of the plurality of applications is failed and a lower priority application of the plurality of applications is executing properly.

10. The system of claim 7, wherein program instructions are executable to implement a decision-making agent executing in a virtual machine monitor.

11. The system of claim 7, wherein the program instructions are further executable to decide that the application monitoring agent should attempt to restart the application, in response to the operating system interface indicating that the application is not operating properly, prior to determining whether the virtual machine should be restarted.

12. A non-transitory computer readable storage medium comprising program instructions executable to:
generate information indicating a state of each of a plurality of applications executing in a virtual machine, wherein
generating the information is performed by an application monitoring agent executing outside of the virtual machine,
the application monitoring agent obtains the state of each of the plurality of applications by interacting with an operating system interface provided by an operating system of the virtual machine, and
the application monitoring agent is configured to monitor at least one application on each of a plurality of virtual machines;
monitor an operating state of a virtual machine, wherein
monitoring the virtual machine is performed by a virtual machine monitoring agent, and
the application monitoring agent and the virtual machine monitoring agent are implemented by a virtual machine monitor;
receive information indicating the state of each of the plurality of applications executing in the virtual machine;
in response to the operating state of the virtual machine and receipt of the information, determine whether the virtual machine should be restarted, based at least in part on the state of each of the plurality of applications executing in the virtual machine and a priority of each of the plurality of applications; and
restart the virtual machine in response to the determination as to whether the virtual machine should be restarted.

13. The non-transitory computer readable storage medium of claim 12, wherein program instructions are executable to implement a decision-making agent executing in a virtual machine monitor.

14. The non-transitory computer readable storage medium of claim 12, wherein the program instructions are further executable to decide that the application monitoring agent should attempt to restart the application, in response to the operating system interface indicating that the application is not operating properly, prior to determining whether the virtual machine should be restarted.

* * * * *